United States Patent
Chung

(10) Patent No.: US 6,949,311 B2
(45) Date of Patent: Sep. 27, 2005

(54) BATTERY STRUCTURE

(76) Inventor: Yu-Lin Chung, No. 4, Lane 130, Nan-Kang Rd., Sec. 3, Taipei (TW)

(*) Notice: Subject to any disclaimer, the term of this patent is extended or adjusted under 35 U.S.C. 154(b) by 319 days.

(21) Appl. No.: 10/329,551

(22) Filed: Dec. 27, 2002

(65) Prior Publication Data
US 2004/0126657 A1 Jul. 1, 2004

(51) Int. Cl.$^7$ .......................... H01M 2/12; H01M 2/08; H01M 2/04
(52) U.S. Cl. .......................... 429/56; 429/175; 429/176
(58) Field of Search .......................... 429/185, 53, 54, 429/56, 175, 176, 163, 231.95

(56) References Cited

U.S. PATENT DOCUMENTS

| 2,491,370 | A | * | 12/1949 | Forster | 429/86 |
| 4,002,495 | A | * | 1/1977 | Hakarine | 429/87 |
| 4,592,970 | A | * | 6/1986 | Zupancic | 429/82 |
| 5,122,427 | A | * | 6/1992 | Flowers et al. | 429/97 |
| 6,132,900 | A | * | 10/2000 | Yoshizawa et al. | 429/185 |

* cited by examiner

Primary Examiner—Patrick Joseph Ryan
Assistant Examiner—Thomas H. Parsons
(74) Attorney, Agent, or Firm—Bacon & Thomas, PLLC

(57) ABSTRACT

The invention discloses a battery structure formed by the steps of: securing and adhering upper and lower plastic casings; sealing lithium cell raw material using plastic; connecting a contact of the lithium cell raw material to an metal contact of the embedded plastic extrusion contact; and the characteristics thereof are that the upper plastic casing is provided with an explosion-proof ventilator, the cell raw material is sealed by means of plastic, and the explosion-proof ventilator is able to prevent explosions caused by overheating from short circuit and collisions of the battery.

7 Claims, 2 Drawing Sheets

BATTERY STRUCTURE

BACKGROUND OF THE INVENTION (a) Field of the Invention

The invention relates to a battery structure, and more particularly, to a battery structure comprising plastic casings for sealing and a lithium cell being sealed. The plastic casings are provided with an explosion-proof ventilator for preventing explosion caused by collisions or overheating from short circuit.

(b) Description of the Related Art

A physical injury by a cell phone explosion was reported by the media recently. The reason for the explosion was that the battery in the cell phone overheated from short circuit, and the air within the battery was unable to discharge in the absence of any outlets. Referring to FIG. 1 illustrating a manufacturing process of a prior lithium battery used in cell phones comprising the steps of: soldering lithium cell raw material 100 to a cell contact 200; covering the exterior thereof with a metal casing 300; excavating a ventilator at one end of the metal casing 300; injecting substances after vacuuming the interior of the battery through the ventilator; and sealing the ventilator and thus forming a metal casing sealed battery without an explosion-proof ventilator.

Furthermore, a type of macromolecular lithium battery is also developed using aluminum foil for sealing the battery.

However, both of the above prior batteries are entirely sealed without having ventilators, and therefore collisions and overheating from short circuit are likely to cause explosions that jeopardize the users life.

SUMMARY OF THE INVENTION

Therefore, an object of the invention is to provide a battery structure using a plastic casing for sealing lithium cell raw material, wherein the plastic casings are further provided with an explosion-proof ventilator. Substances produced by collisions and overheating from short circuit of the battery may then be discharged through the explosion-proof ventilator without causing explosions.

DESCRIPTION OF THE PREFERRED EMBODIMENTS

Figure 1:
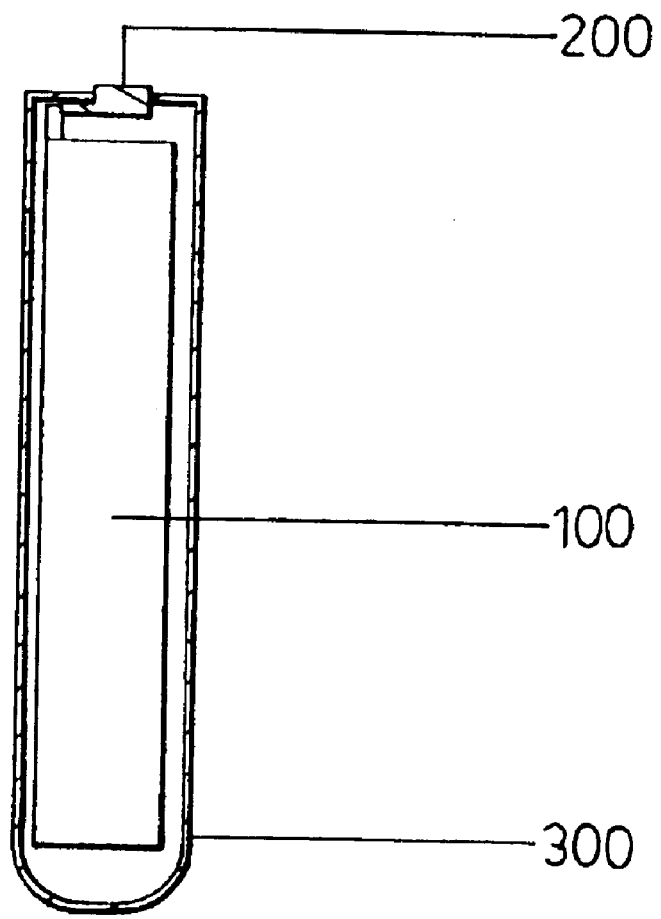
FIG. 1 is a sectional view showing a prior product.
Figure 2:
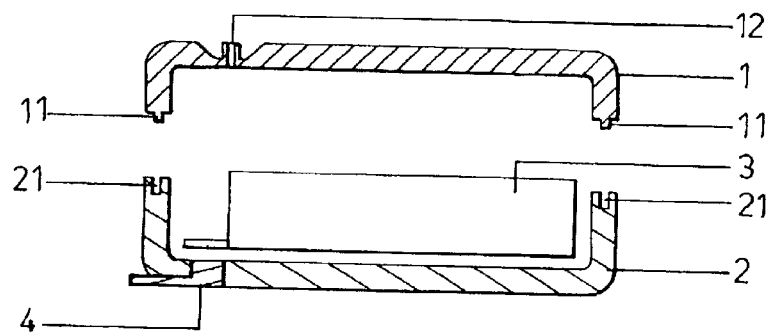
FIG. 2 is an exploded sectional view in accordance with the invention.
Figure 3:
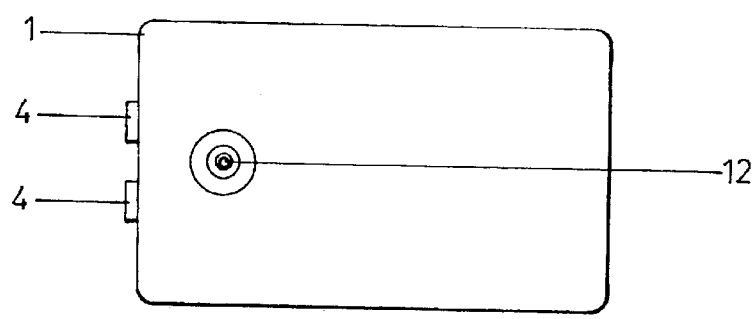
FIG. 3 is a top planar view in accordance with the invention.
Figure 4:
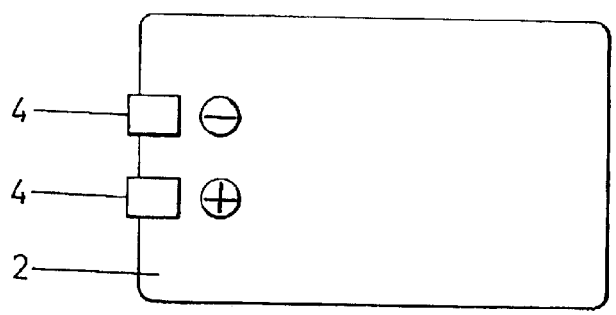
FIG. 4 is an upward planar view in accordance with the invention.

Referring to FIGS. 2 to 4, the structure in accordance with the invention comprises upper and lower casings 1 and 2, lithium cell raw material 3 and a battery contact 4. Wherein, at the two bottom terminals of the upper extruded plastic casing 1 are provided with a protrusion 11, respectively, and at the two top terminals of the lower plastic casing 2 are provided with a hollow 21, respectively. The lithium cell raw material 3 is disposed within between the upper an lower casings 1 and 2, which are then combined into one body by securing the protrusions 11 at the upper casing 1 into the glued hollows 21 at the lower casing 2. The contact of the lithium cell raw material 3 is connected to the embedded plastic extrusion contact during sealing, and the coherence of the embedded extrusion contact and the plastic is further reinforced by means of glue. The characteristics of the structure in accordance with the invention are that the upper plastic casing 1 is already provided with an explosion-proof ventilator 12 at the time of plastic extrusion; the explosion-proof ventilator 12 is sealed after connecting the upper and lower casings 1 and 2, vacuuming the interior thereof and injecting substances in order to become a sealed state. During collisions or overheating from short circuit, the vacuum substances within the interior of the battery may break through the explosion-proof ventilator 12 at the upper casing 1, thus preventing explosions due to lack of outlets.

Conclusive from the above, the battery structure in accordance with the invention seals lithium cell raw material with upper and lower casings, wherein the upper case is further provided with an explosion-proof ventilator. And therefore explosions by overheating from short circuit and collisions are prevented, thereby safeguarding the life of the user.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A battery structure comprising upper and lower plastic casings, lithium cell raw material and a battery contact, formed by the steps of:

securing and adhering the upper and lower plastic casings;

sealing the lithium cell raw material within the connected plastic casings, and connecting the metal contact of the lithium cell raw material to the plastic embedded extrusion contact;

sealing the plastic embedded extrusion contact with a cell contact by means of glue;

reinforcing the connecting area of the upper and lower plastic casings by means of glue;

providing an explosion-proof ventilator at the time of extrusion having an explosion-proof function at the upper plastic casing for vacuuming and injecting substances, such that the explosion-proof ventilator is able to prevent explosions caused by overheating from short circuit or collisions.

2. The battery structure according to claim 1, wherein the upper plastic casing further comprises protrusions at the bottom terminals thereof, respectively, and the lower plastic casing further comprises hollows at the top terminals thereof for mating with said protrusions, respectively, so that an air-tight state is achieved by securing the protrusions into the hollows; and by connecting the embedded extrusion plastic contact to the metal contact of lithium cell raw material by means of glue, an air-tight state of the plastic and metal is also achieve, thereby combining the upper and lower plastic casings into one complete body.

3. An explosion-proof battery structure comprising:
upper and lower extruded plastic casings secured together and enclosing lithium cell raw material and battery contacts;
wherein the upper plastic casing contains a sealed integral extruded plastic vent for vacuuming and injecting substances.

4. The explosion-proof battery structure of claim 3, wherein the casings are secured together with glue.

5. The explosion-proof battery structure of claim 3, wherein in the upper casing has protrusion which mate with hollows in the lower casing.

6. The explosion-proof battery structure of claim 5, wherein the casings are secured together with glue.

7. The explosion-proof battery structure of claim 6 which further encloses a vacuum.

* * * * *